United States Patent [19]

Oswald et al.

[11] Patent Number: 4,458,772
[45] Date of Patent: Jul. 10, 1984

[54] INTERCHANGEABLE UNDERCARRIAGE UNIT

[75] Inventors: Norman D. Oswald, Duncanville; Harry S. Mankey; Carl M. Franklin, both of Dallas, all of Tex.

[73] Assignee: Standard Manufacturing Company, Inc., Dallas, Tex.

[21] Appl. No.: 431,762

[22] Filed: Sep. 30, 1982

Related U.S. Application Data

[63] Continuation of Ser. No. 112,727, Jan. 17, 1980, abandoned.

[51] Int. Cl.³ ............................................. B62D 11/00
[52] U.S. Cl. ..................................... 180/6.2; 180/6.48
[58] Field of Search ...................... 180/6.2, 6.44, 6.48, 180/6.5, 6.54, 6.58, 6.62, 6.66

[56] References Cited

U.S. PATENT DOCUMENTS

| | | | |
|---|---|---|---|
| 2,416,478 | 2/1947 | Harbers | 180/6.2 |
| 3,623,565 | 11/1971 | Ward et al. | 180/6.2 |
| 3,771,615 | 11/1973 | Rieli | 180/6.48 |
| 3,785,449 | 1/1974 | Ries | 180/6.48 |
| 3,799,362 | 3/1974 | Oswald et al. | 180/6.48 |

*Primary Examiner*—Richard A. Bertsch
*Attorney, Agent, or Firm*—Michael A. O'Neil

[57] ABSTRACT

A wheeled undercarriage unit (10) adapted to replace a tracked unit comprises elongate hollow side frames (12, 14) rigidly interconnected by cross frames (16, 18). Six wheels (20, 22, 24, 26, 28, 30) are rotatably supported in pairs on the side frames (12, 14). The wheels on each side of the unit (10) are drivingly interconnected by chain and sprocket transmissions located within the side frames (12, 14). The drive means for the wheels (20, 22, 24, 26, 28, 30) are located between the side frames (12, 14) and cross frames (16, 18). The middle wheels (22, 28) extend below a plane lying tangent to the end wheels (20, 24, 26, 30) to facilitate skid steering. Mounting pads (96) are provided for attaching a mechanism to the undercarriage unit (10). In addition to the capability of operating over adverse terrain, a vehicle incorporating the unit (10) can be operated over a paved surface without the damage thereto that would be caused otherwise by a tracked unit.

6 Claims, 11 Drawing Figures

INTERCHANGEABLE UNDERCARRIAGE UNIT

This is a continuation of application Ser. No. 112,727 filed Jan. 17, 1980, now abandoned.

TECHNICAL FIELD

The present invention relates in general to an undercarriage for use with an adverse terrain vehicle. More particularly, this invention concerns a wheeled undercarriage unit adapted to be substituted for a tracked undercarriage unit to increase mobility and versatility of a vehicle.

BACKGROUND ART

Vehicles which operate over adverse terrain have traditionally employed track drive systems. Track driven bulldozers, loaders, excavators, cranes and other relatively heavy industrial vehicles have been in use for decades, as have armored tanks and other track driven military vehicles. The tracks comprise a number of rigid tread elements pivotally interconnected in series to form bands which are supported for movement around predetermined courses on the sides of the vehicle. The tracks are in fixed lateral positions and propulsion is effected by movement of the tread elements. Steering is accomplished by differential drive of the tracks.

Track drive systems are advantageous in some respects and disadvantageous in several others. The relatively large and long contact area of the tracks enables a heavy vehicle to negotiate uneven terrain without difficulty. On the other hand, a power plant of considerable size is required to overcome the resistance generated by the large contact area of the tracks. Further, since the tracks are constructed of rigid tread elements, at least some surface damage occurs during operation of a track driven vehicle, and particularly during maneuvering of the vehicle in close quarters.

Track driven vehicles are thus more suitable for operation over rough terrain rather than over a paved or prepared surface. The inability to operate over a paved surface without causing undue damage thereto can restrict the usefulness and versatility of vehicles incorporating track drive systems. Such vehicles are typically specialized, complex and thus expensive, but limited somewhat in their utility due to the surface damage caused by track drive systems. Even when operated over smooth surfaces, the speeds attainable by such vehicles tend to be relatively slow due to the track drive systems.

More recently, wheeled vehicles capable of operation over both smooth and rough terrain have been developed. U.S. Pat. No. 3,799,362, entitled Six Wheel Material Handling Vehicle and assigned to the assignee hereof, illustrates a successful example of one such vehicle. Other vehicles incorporating multiple wheels and the principle of skid steering have been developed especially for use with particular mechanisms. In addition, multiple wheeled undercarriage assemblies employing lower middle wheels to facilitate skid steering have been developed. Heretofore, however, there has not been available a complete multi-wheeled undercarriage unit adapted to be interchanged with a track drive undercarriage to make a particular mechanism operable over smooth terrain with little or no damage thereto, as well as over adverse terrain.

DISCLOSURE OF INVENTION

The present invention comprises an interchangeable undercarriage unit for adverse terrain vehicles which overcomes the foregoing and other difficulties associated with the prior art. In accordance with the invention, an undercarriage unit includes a pair of longitudinal side frame structures with cross frame structure rigidly secured therebetween. Axles are rotatably supported along each side frame. Tired wheels are mounted on the outboard ends of the axles. The axles on each side of the undercarriage unit are drivingly interconnected by separate transmissions located within the side frames. The middle wheel on each side of the undercarriage unit extends lower than the end wheels to facilitate skid steering. Predetermined mounting pads are provided on the frames for mating the wheeled undercarriage unit to a mechanism in place of a track driven undercarriage. Conversion to a multi-wheeled drive system enhances the mobility, utility and versatility of the vehicle.

In accordance with more specific aspects of the invention, an interchangeable undercarriage unit comprises a pair of box-beam side frames extending in longitudinally spaced relationship. The side frames are rigidly interconnected by cross frames. Three axles are rotatably supported in longitudinally spaced relationship by each side frame. The axles in each side frame are interconnected by a drive system including sprockets and chains. Pneumatic tired wheels are secured to the ends of the axles. Preferably, the center pair of wheels extend below a plane lying tangent to the endmost pairs of wheels to achieve the effect of a short wheelbase for easier skid steering over a hard surface, and to achieve the effect of a relatively long wheelbase for greater stability during operation over adverse terrain. The middle wheels can be relatively larger, or of the same size as the other wheels and mounted for rotation about an axis located beneath the axes of the end wheels. Preferably, all the wheels are of reversible construction to provide for operation in narrow or wide track modes. Mounting pads including preselected bolt hole patterns are provided on the side frames in predetermined locations so that the multiwheeled undercarriage unit can be directly substituted for the track drive system with which a particular vehicle was originally provided.

BRIEF DESCRIPTION OF DRAWINGS

A more complete understanding of the invention can be had by referring to the following Detailed Description in conjunction with the accompanying Drawings, wherein.

DETAILED DESCRIPTION

Figure 1:
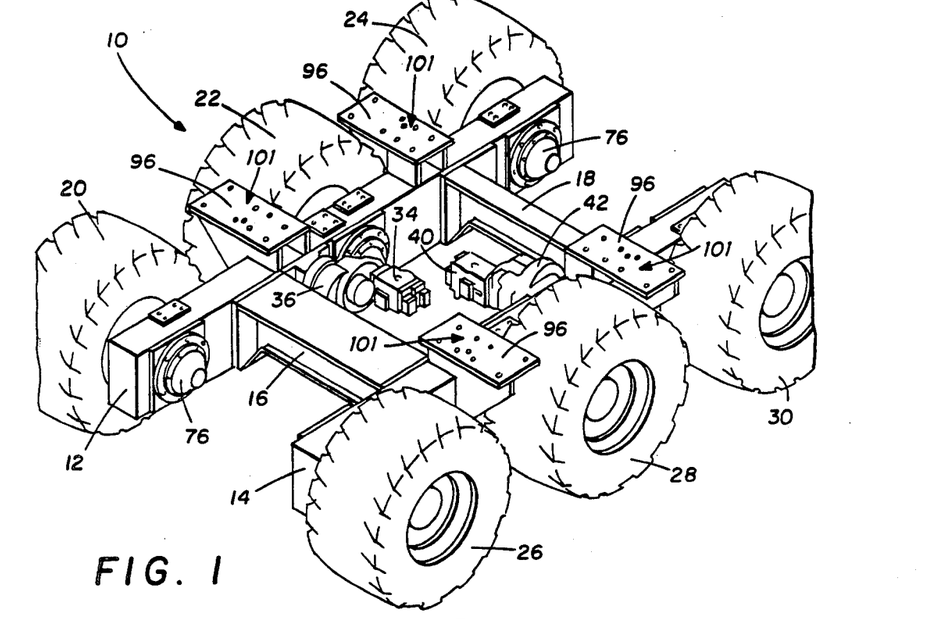
FIG. 1 is a perspective view of an undercarriage unit incorporating the invention.

Referring now to the Drawings, wherein like reference numerals designate like or corresponding parts throughout the several views, and particularly referring to FIG. 1, there is shown an undercarriage unit 10 incorporating the invention. Undercarriage unit 10 comprises a multi-wheeled assembly which is particularly adapted to be interchanged with a track-drive undercarriage assembly in an adverse terrain vehicle such as a crane, loader, excavator or the like. Undercarriage unit 10 can be used with vehicles having a gross weight up to 50,000 pounds. Substitution of undercarriage unit 10 facilitates operation of the vehicle over rough terrain, as well as over a smooth surface that would otherwise be damaged by tracks. Use of the undercarriage unit 10 improves mobility and versatility of the vehicle and extends utility of the mechanism supported by the unit.

Figure 2:
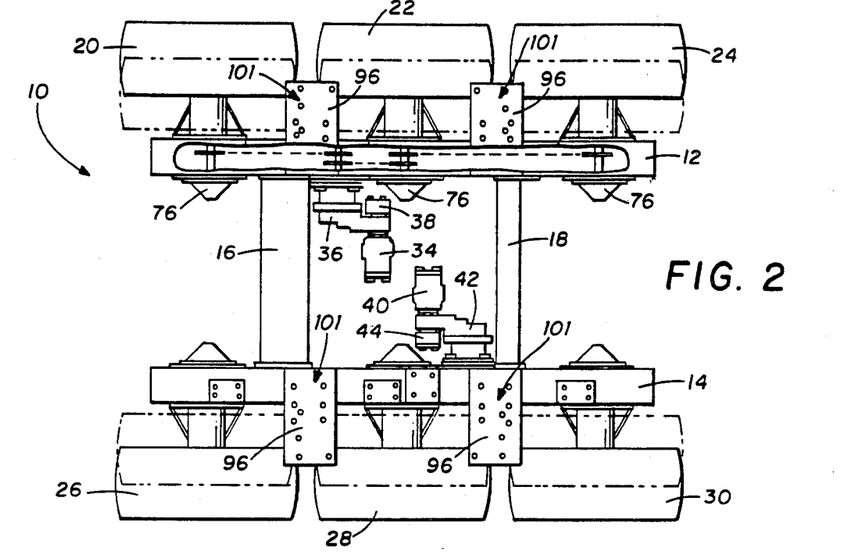
FIG. 2 is a top view, partially broken away, of the undercarriage unit shown in FIG. 1.
Figure 3:
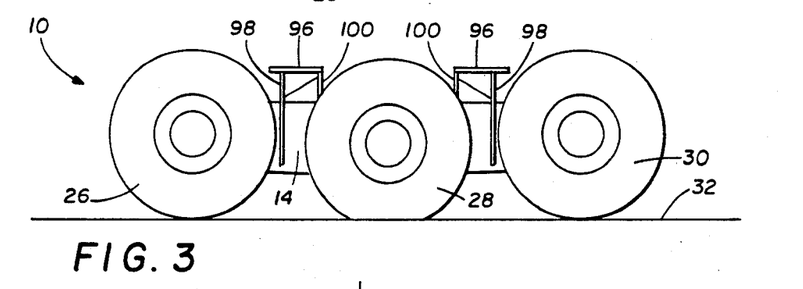
FIG. 3 is a side view of the undercarriage unit shown in FIG. 2.

Referring to FIGS. 1-3, undercarriage unit 10 includes a pair of longitudinally extending side frames 12 and 14 interconnected by a pair of cross frames 16 and 18. Frames 12 and 14 comprise elongate, hollow load-bearing frame structures. In accordance with the preferred construction, side frames 12 and 14 are constructed from steel plates welded together to form box-beam structures of generally rectangular cross section and about 144 inches length. Frames 12 and 14 are preferably of sealed construction so that lubricant can be carried for the drive transmission therein. Drain plugs (not shown) are provided in the bottom surfaces of frames 12 and 14 for drainage of lubricant therefrom.

Cross frames 16 and 18 are about 57 inches in length and comprise I-beam sections. Cross frames 16 and 18 can be secured between side frames 12 and 14 by any suitable means, such as welding. The frame of undercarriage unit 10 thus comprises a pair of tubular side frames 12 and 14 joined together by a pair of cross frames 16 and 18.

Undercarriage unit 10 is supported by six tired wheels, whose rolling resistance is considerably less than a track-driven undercarriage with which the unit herein is interchangeable. Wheels 20, 22 and 24 are mounted for rotation on the outboard side of side frame 12. Wheels 26, 28 and 30 are mounted for rotation on the outboard side of side frame 14. Wheels 20, 24, 26 and 30 comprise the end sets of wheels and wheels 22 and 28 comprise the middle set of wheels in undercarriage unit 10.

Middle wheels 22 and 28 protrude below a plane 32, as is best shown in FIG. 3. Plane 32 lies tangent to the bottom surfaces of end wheels 20, 24, 26 and 30. In accordance with the preferred construction, wheels 20-30 are of equal diameters with middle wheels 22 and 28 being mounted for rotation about a common axis positioned a predetermined distance below the axes of rotation of the endmost pairs of wheels. For example, wheels 20-30 can be of 52 inch diameters and 24 inch widths, with middle wheels 22 and 28 positioned about 3 inches lower than the other wheels. If desired, relatively larger wheels can be used for the middle pair of wheels 22 and 28 to achieve the same effect. It will be understood that undercarriage unit 10 utilizes a multi-wheeled configuration wherein the bottoms of the middle wheels 22 and 28 are beneath and thereby uneven with the bottoms of the end wheels 20, 24, 26 and 30.

The use of relatively lower middle wheels 22 and 28 in undercarriage unit 10 comprises a significant feature of the invention. Track-driven vehicles, or vehicles utilizing multiple wheels with bottoms in even relationship, have fixed wheelbases. A short wheelbase facilitates skid steering of a vehicle but renders it more susceptible to pitching motion. On the other hand, a longer wheelbase increases longitudinal stability of the vehicle but makes skid steering thereof difficult.

The advantages of both short and long wheelbases are derived by means of an undercarriage configuration having lower middle wheels. The arrangement of wheels or undercarriage unit 10 effectively provides two different wheelbases. During operation over a paved or otherwise relatively smooth surface, the vehicle incorporating unit 10 will be able to rock forward or backwards slightly depending upon the center of gravity and loading characteristics of the particular mechanism supported by the unit. The vehicle rests primarily on the middle pair of wheels 22 and 28 and one endmost pair of wheels, while the remaining pair of wheels are in reduced contact with the surface. The primary wheelbase of a vehicle incorporating undercarriage unit 10 therefore comprises the distance between middle wheels 22 and 28 and end wheels 20 and 26 or 24 and 30. As a consequence, less power is required to skidsteer the vehicle, and one pair of end wheels 20 and 26 or 24 and 30 serves to limit forward or backward rocking of the vehicle.

During operation over adverse or softer terrain, such as sand, mud or loose dirt, all six wheels 20-30 will be in firm engagement with the terrain. This is because middle wheels 22 and 28 sink into the terrain until floatation occurs. The secondary wheelbase of undercarriage unit 10 thus comprises the distance between end wheels 20 and 26 and end wheels 24 and 30. Superior traction, stability and control will thus be achieved because all wheels are driven and in engagement with the surface. In addition, the possibility of surface rutting is lessened because of lower pressure beneath each wheel.

Figure 4:
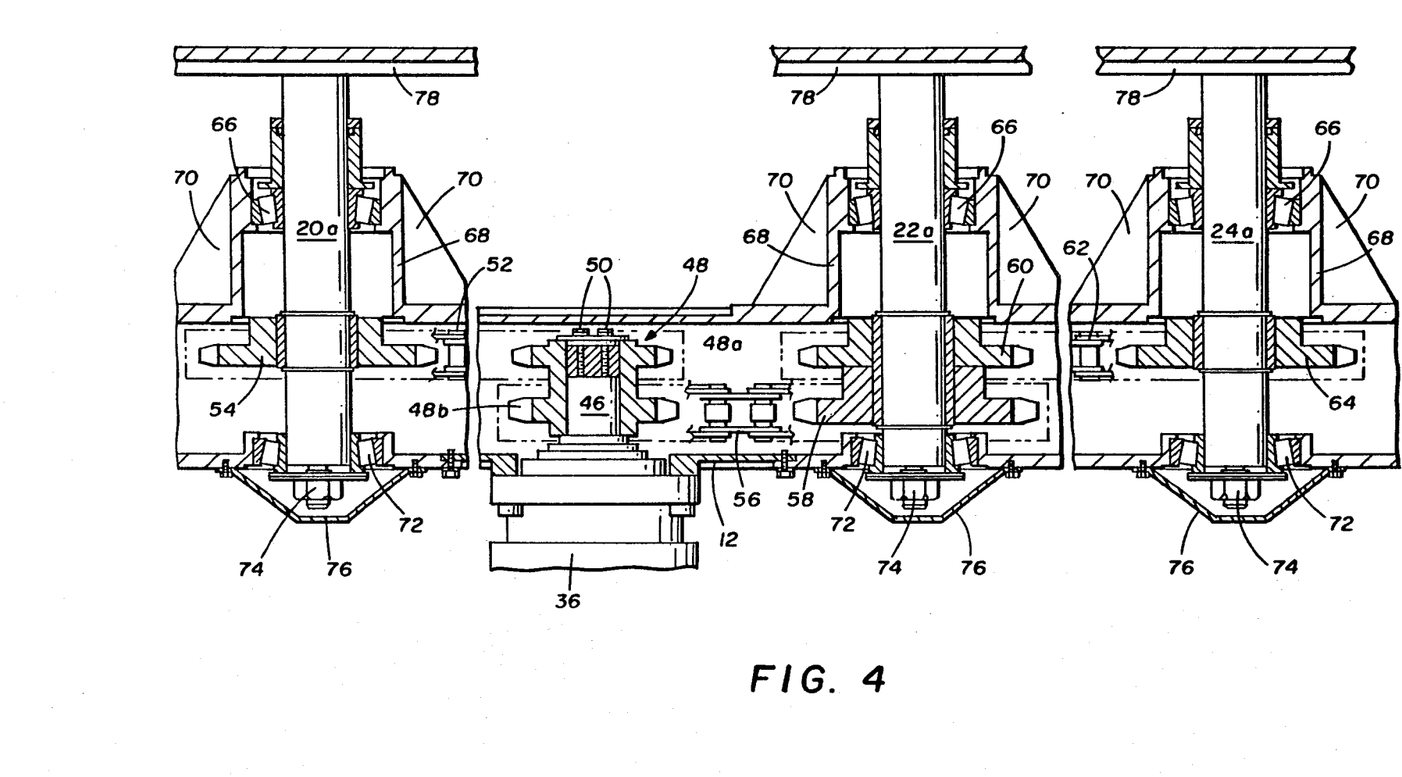
FIG. 4 is an enlarged horizontal section view, partially cut away, showing the drive train of the undercarriage unit herein.

The undercarriage unit 10 includes a drive system, which is best illustrated in FIGS. 2 and 4. The wheels on each side of undercarriage unit 10 are interconnected and driven independently of the wheels on the other side of the unit. Wheels 20, 22 and 24 are driven by a motor 34 coupled to a speed reducer or gear box 36 mounted on the inner wall of side frame 12. A brake 38 is also coupled to gear box 36. Wheels 26, 28 and 30 on side frame 14 are driven by a similar arrangement including a motor 40, speed reducer or gear box 42 and brake 44.

Motors 34 and 40 can be either single speed or multi-speed motors. In accordance with the preferred construction of the invention, motors 34 and 40 comprise two-speed units of the hydraulic type operated by the output of remotely located hydraulic pumps (not shown) driven by the engine of the particular mechanism mounted on undercarriage unit 10. In actual practice it has been possible to achieve speeds of about three to six miles per hour with suitable two-speed hydraulic motors 34 and 40 and a gross vehicle weight of up to 50,000 pounds. Motors 34 and 40, gear boxes 36 and 42 and brakes 38 and 44 are located in a protected position inboard side frames 12 and 14 and cross frames 16 and 18.

Wheels 20, 22 and 24 are drivingly interconnected by a transmission located completely within side frame 12. Wheels 26, 28 and 30 on side frame 14 are drivingly interconnected by a similar transmission. The entire drive system for undercarriage unit 10 is thus protected either inside or between side frames 12 and 14.

Referring to FIG. 4, further details of the drive system for wheels 20, 22 and 24 can be seen. Gear box 36 includes an output shaft 46 on which is mounted a drive sprocket 48 which is located inside side frame 12. Sprocket 48 is provided with two sets of teeth, 48a and 48b. Drive sprocket 48 is secured to shaft 46 with bolts 50.

Drive sprocket 48 is connected directly to middle wheel 22 and one of the end wheels 20 or 24. As shown, drive sprocket 48 is positioned between and connected directly to wheels 20 and 22. A chain 52 connects teeth 48a on drive sprocket 48 to sprocket 54 mounted on axle 20a of wheel 20. Chain 56 interconnects teeth 48b on drive sprocket 48 with sprocket 58 secured to axle 22a of middle wheel 22. Sprockets 54 and 58 thus rotate in unison with drive sprocket 48.

A second sprocket 60 is also attached to axle 22a. Chain 62 in turn extends between sprocket 60 and sprocket 64 on axle 24a of wheel 24. Sprockets 54, 58, 60 and 64 are thus all constrained for rotation in unison with drive sprocket 48. Preferably, removable plates are provided on the upper surfaces of side frames 12 and 14 for access to components therein.

The axles 20a, 22a and 24a are rotatably supported in longitudinally spaced apart relationship in side frame 12. When utilizing wheels of 52 inch diameters, the axles can be about 60 inches apart. The outboard ends of axles 20a, 22a and 24a are supported by outer bearing assemblies 66 located in cup-like frame extensions 68 attached to the outer wall of side frame 12. Preferably, four triangular braces or gussets 70 are affixed between each frame extension 68 and side frame 12 for additional reinforcement. The inboard ends of axles 20a, 22a and 24a are supported by inner bearing assemblies 72 mounted in the inner wall of side frame 12. Nuts 74 secure axles 20a, 22a and 24a to side frame 12. Covers 76 enclose bearing assemblies 72 and nuts 74 to protect the inboard ends of the axles.

Hubs 78 are provided on the outboard ends of axles 20a, 22a and 24a. Wheels 20, 22 and 24 are mounted on the hubs 78 of their corresponding axle with lugs (not shown). It will thus be apparent that wheels 20, 22 and 24 are operatively interconnected to motor 34 and brake 38 through gear box 36 and a chain and sprocket arrangement. Rotation of the wheels on side frame 12 can thus be effected or arrested concurrently. A similar arrangement of sprockets and chains are utilized to operatively interconnect wheels 26, 28 and 30 on side frame 14 to motor 40, gearbox 42 and brake 44. Undercarriage unit 10 is both propelled and steered by this hydrostatic drive system.

Figure 5:
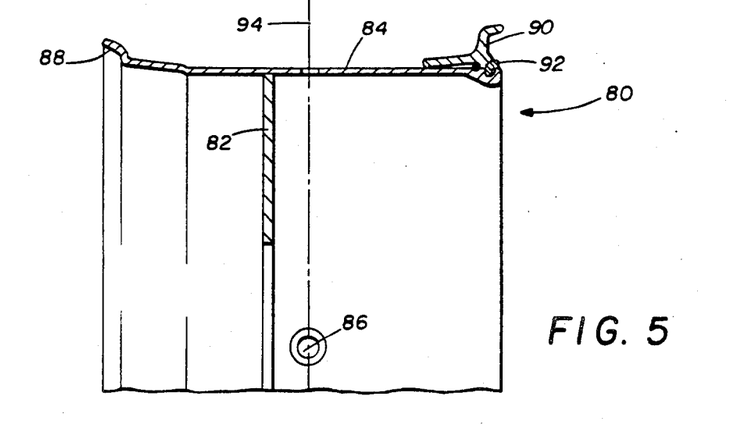
FIG. 5 is an enlarged partial vertical section view of a wheel member used with the undercarriage unit herein.

In accordance with the preferred construction of undercarriage unit 10, wheels 20-30 are reversible. Each wheel comprises a pneumatic tire supported by a rigid wheel frame. FIG. 5 illustrates a suitable wheel frame 80 including a center rim 82 and an outer rim 84. An opening 86 is provided in outer rim 84 for a tire valve stem (not shown). Outer rim 84 includes an integral flange 88 formed on one edge thereof. A removable flange 90 and lock ring 92 are provided on the opposite edge of outer rim 84 to secure the tire (not shown) thereon. Center rim 82 is offset from the center line 94 of outer rim 84 a distance corresponding to one-half of the added wheel track desired upon reversal of the wheels. For example, offsetting center rim 82 in each wheel frame 80 by 4.5 inches would change the wheel track by 9.0 inches simply by reversing the wheels. By means of reversible wheels, undercarriage unit 10 can be operated in narrow or wide track configurations.

FIG. 2 illustrates undercarriage unit 10 in a wide track configuration with wheels 20-30 outlined in full lines, the narrow track configuration being shown in phantom lines.

The use of reversible wheels 20-30 in undercarriage unit 10 also comprises a significant feature of the invention. A narrow track configuration may be desirable to facilitate shipping of the undercarriage unit 10, or to permit operation of the unit in a narrow space. A vehicle including unit 10 in the narrow configuration could be self-loaded onto a railway car or highway trailer bed. Generally, however, a wider track configuration is desired when the undercarriage unit 10 is in service. In addition to the advantages of the lower center wheel arrangement mentioned hereinabove, a wider track further facilitates skid steering. A wider track permits unit 10 to be transported while resting on frames 12-18 rather than wheels 20-30 to lower the overall height and reduce clearance requirements during shipping. Moreover, a wider track stabilizes undercarriage unit 10 sufficiently to eliminate the need for outriggers.

Stability and maneuverability of the vehicle can thus be enhanced simply be reversing wheels 20-30. Track-drive systems have fixed wheelbases and tracks and thus do not have this capability. Substitution of undercarriage unit 10 eliminates these limitations and the complexities of a track-drive system as well as the outriggers which have generally been required heretofore with such systems.

Referring again to FIGS. 1-3, undercarriage unit 10 preferably includes four mounting pads 96 attached to side frames 12 and 14. Two mounting pads 96 are secured to side frame 12 between middle wheel 22 and end wheels 20 and 24. Two mounting pads 96 are secured to side frame 14 in similar fashion between middle wheel 28 and end wheels 26 and 30. Each mounting pad 96 is supported above the upper wall of its corresponding side frame with two vertical braces 98 and 100, which are best shown in FIG. 3. Mounting pads 96 are preferably provided with predetermined patterns of bolt holes 101 corresponding to the particular mechanism to be mated with unit 10. Bolt holes 101, for example, can be arranged to correspond with Model 215 or 225 CATERPILLAR crane car bodies.

It will be understood that provision of mounting pads 96 having predetermined bolt holes 101 with undercarriage unit 10 comprises another significant feature of the invention. Mounting pads 96 drilled with holes 101 facilitate direct substitution of unit 10 in place of a tracked undercarriage.

Figure 6:
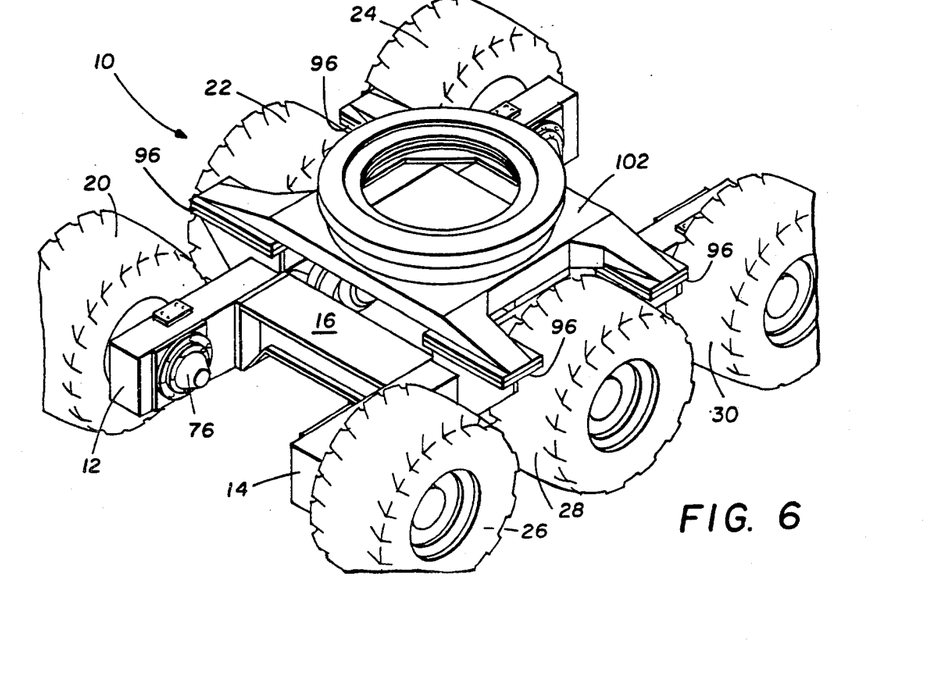
FIG. 6 is a perspective view of the undercarriage unit herein illustrating an adapter secured to the mounting pads thereon.

FIG. 6 illustrates the undercarriage unit 10 with an adapter 102 secured to mounting pads 96. Adapter 102 as illustrated comprises a CATERPILLAR brand car body for interfacing with a crane, excavator or other mechanism. Adapter 102, for example, can comprise the car body for Model 215 or 225 CATERPILLAR cranes. Other forms of adapters can be used, as desired. Adapter 102 comprises the means by which the particular mechanism is mounted on its undercarriage.

FIGS. 7-11 show several vehicles to which the undercarriage unit 10 herein can be adapted. Although the vehicles illustrated have different operational and functional characteristics, the present invention is compatible for use with each vehicle.

Figure 7:
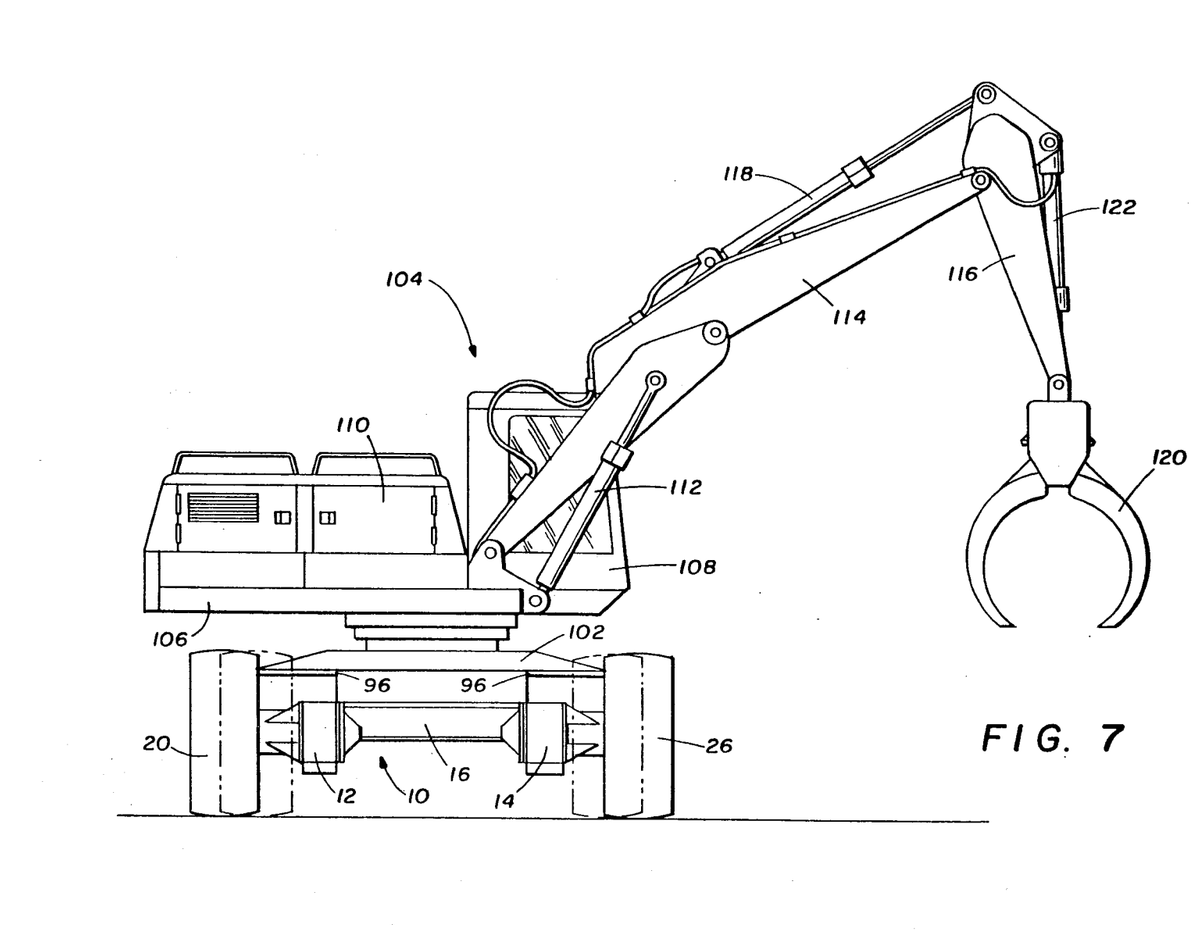
FIGS. 7-11 are elevation views illustrating applications of the invention herein.

FIG. 7 illustrates a crane 104 rotatably supported on adapter 102 and undercarriage unit 10. Crane 104 includes a frame 106 supporting a cab 108 for the operator and a compartment 110 in which the prime mover is located. A cylinder 112 actuates a boom section 114 which is pivoted to frame 106. A second boom section 116 is pivotally mounted at the end of boom section 114. Movement of boom section 116 is effected by a cylinder 118. Claws 120 located at the end of boom section 116 are actuated by cylinder 122. The wheels of undercarriage unit 10 are shown with full lines in the wide track configuration, with the narrow track configuration being shown in phantom lines.

Figure 8:
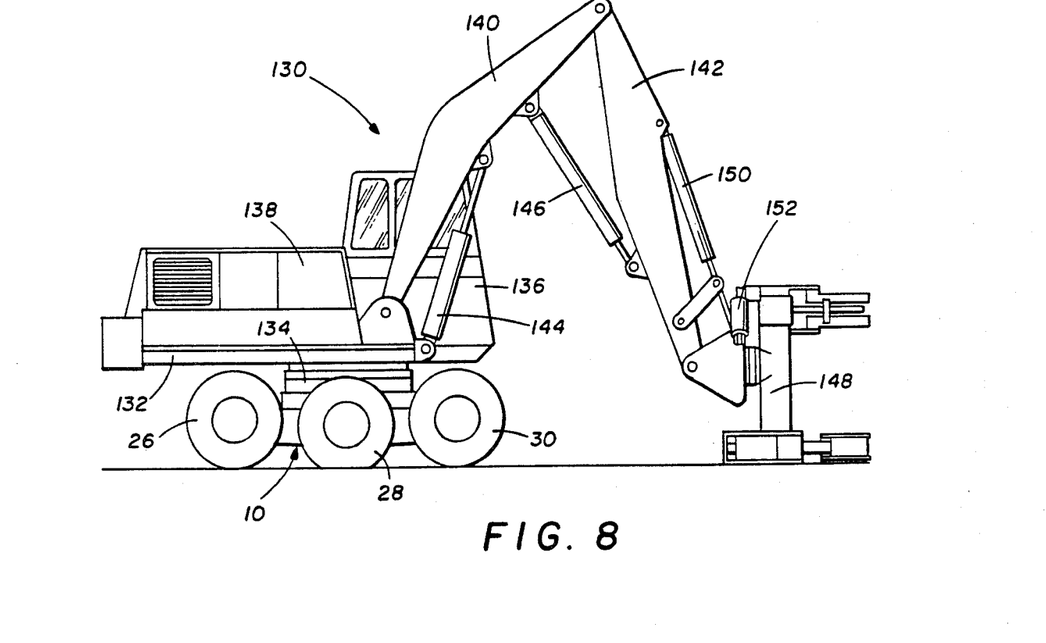

FIG. 8 illustrates a feller/buncher vehicle 130 of the type utilized in the forestry industry. Vehicle 130 includes a frame 132 mounted on an adapter 134 secured to an undercarriage unit 10. A cab 136 for the operator is supported by frame 132, as is a compartment 138 enclosing the prime mover for the vehicle 130. A first boom section 140 is pivoted to frame 132, and a second boom section 142 is pivotally carried at the end of the first boom section. Boom sections 140 and 142 are actuated by cylinders 144 and 146, respectively. A mechanism 148 is carried at the end of second boom section 142. Mechanism 148 can be pivoted about a horizontal axis by cylinder 150, or about a vertical axis by cylinder 152. The upper portion of mechanism 148 comprises a claw for gathering a group of trees into a bunch after which the trees are severed by a cutter in the lower portion of the mechanism.

Figure 9:
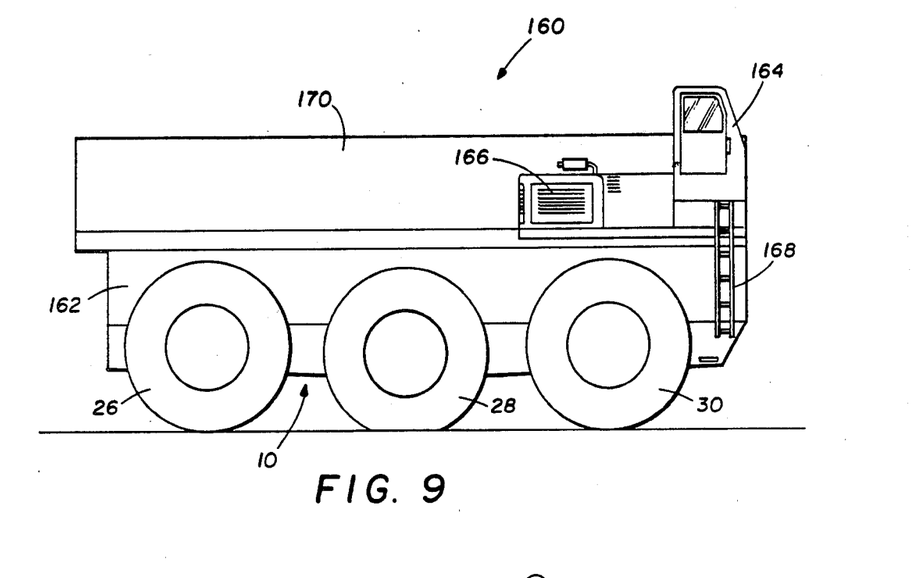

FIG. 9 shows a transporter 160 incorporating an undercarriage unit 10 in accordance with the present invention. Transporter 160 includes a frame 162 having a cab 164 for the operator and an engine compartment 166 mounted thereon. A ladder 168 is provided for the operator to climb to and from cab 164. Frame 162 also supports a bed 170 for receiving material to be transported. For example, transporter 160 may be of the type employed in the forestry industry to transport logs and timber.

Figure 10:
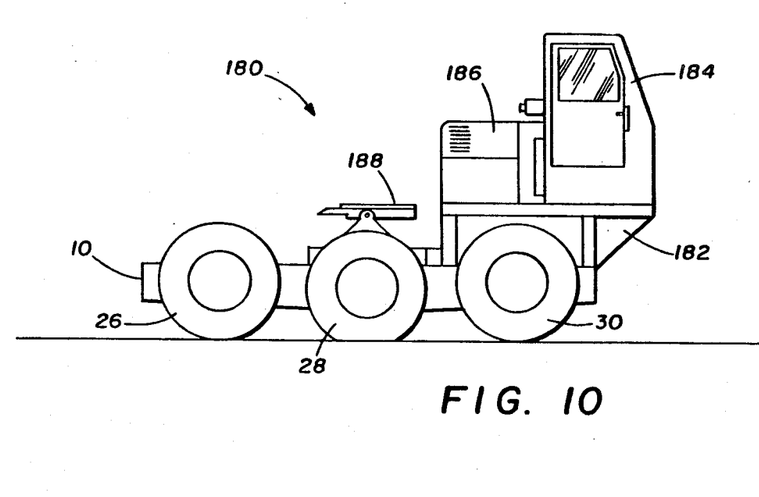

FIG. 10 shows a tractor 180 incorporating an undercarriage unit 10 in accordance with the invention. Tractor 180 comprises a frame 182 supporting a cab 184 for the operator and a compartment 186 for the engine. A hitch 188 is provided for connecting a trailer or the like to tractor 180. Typically, hitch 188 can be positioned forwardly or rearwardly depending upon the trailer connected thereto and its load condition. Vehicles like tractor 180 are sometimes referred to as fifth wheels.

Figure 11:
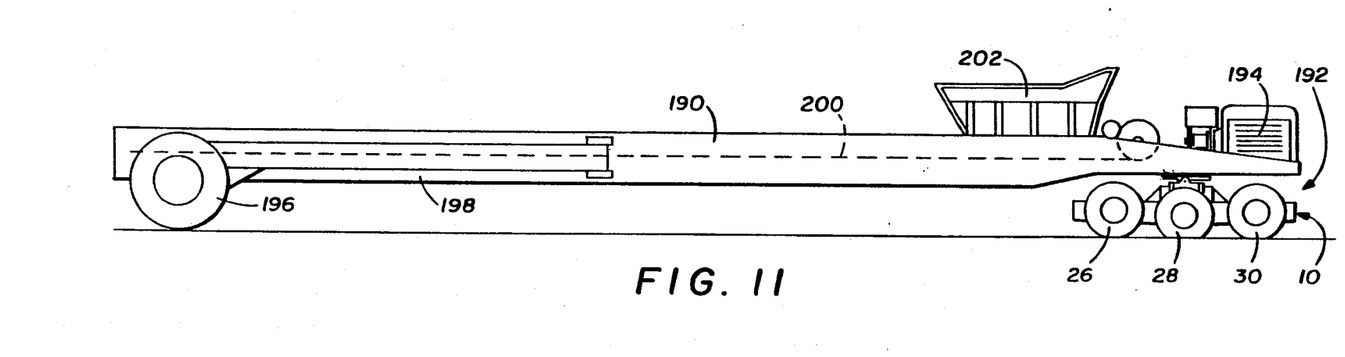

FIG. 11 illustrates a conveyor 190 connected to and supported at one end by a fifth wheel 192 incorporating an undercarriage unit 10. An engine 194 and associated controls (not shown) are mounted at the forward end of conveyor 190. The rear end of conveyor 190 is supported by two wheels 196, only one of which is shown. Each wheel 196 is mounted at the end of a pivotal arm 198 so that conveyor 190 can straddle a ditch. An endless belt 200 is provided for conveying material received by hopper 202. For example, conveyor 190 can be used with a ditching machine to receive excavated material therefrom, and to convey the material back into the ditch after the conduit or pipe line has been laid.

From the foregoing, it will be understood that the present invention comprises a wheeled undercarriage unit having several advantages over the prior art. The undercarriage unit herein can be directly substituted for a track-drive unit. The undercarriage unit herein includes a pair of center wheels relatively lower than the end pairs of wheels to facilitate skid steering on a firm surface and to maintain stability on a soft surface. Replacement of a track drive undercarriage with the wheeled undercarriage unit of the present invention enables a vehicle to be operated over paved surface with little or no damage thereto, thereby increasing versatility and usefulness of the vehicle. The unit is adapted for use in two track width configurations. Use of the undercarriage unit herein reduces or eliminates the need for stabilizing outriggers, particularly when the unit is in the wide track configuration. Other advantages will suggest themselves to those skilled in the art.

Although particular embodiments of the invention have been illustrated in the accompanying drawings and described in the foregoing detailed description, it will be understood that the invention is not limited to the embodiments disclosed, but is intended to embrace any alternatives, modifications, and rearrangements and/or substitutions of parts or elements as fall within the spirit and scope of the invention.

We claim:

1. A rough terrain towing vehicle, comprising:
   (a) an undercarriage unit including:
      pair of elongate hollow load-bearing side frames positioned in spaced apart relationship;
      for rigidly interconnecting said side frames;
      pairs of axles, each axle having a wheel receiving member at one end thereof;
      wheel members each mounted on the wheel receiving end of one of said axles; rotatably supporting said axles at longitudinally spaced points along the side frames with three of said axles being supported on each of said side frames; wheel members of the center pair of axles extending below a plane lying tangent to the bottoms of the endmost wheel members to facilitate skid steering; means positioned within each of said said frames for drivingly interconnecting the axles rotatably supported by said side frame; and
      a pair of drive mechanisms each mounted on one of the side frames and each drivingly connected to the transmission means within its side frame for cooperation therewith to effect concurrent rotation of the three wheel members of its side frame;
   (b) an engine positioned on the undercarriage unit at the front end thereof and operably connected to each of the drive means;
   (c) an operator's compartment mounted on the undercarriage unit at the front end thereof adjacent the engine; and
   (d) hitch means mounted on the undercarriage unit behind the engine and the operator's compartment and substantially in alignment with the center pair of axles and the wheel members mounted thereon for selective connection to cooperating hitch means on a towed vehicle.

2. The rough terrain towing vehicle according to claim 1 wherein each drive mechanism comprises:
   a speed reducer having an output shaft operably connected to said transmission means;
   a hydraulic motor operably connected to said speed reducer; and
   a brake operably connected to said speed reducer;
   and wherein the engine drives a hydraulic pump for supplying pressurized hydraulic fluid to the hydraulic motors of the drive mechanisms.

3. The rough terrain towing vehicle of claim 2 wherein each of said transmission means comprises:

a drive sprocket positioned adjacent the middle axle, and said drive sprocket having two sets of teeth thereon;

first and second sprockets mounted on said middle axle; third and fourth sprockets each mounted on one of said end axles;

a first chain constrained about said first sprocket and one set of teeth on said drive sprocket;

a second chain constrained about the other set of teeth on said drive sprocket and said fourth sprocket; and a third chain constrained about said second and third sprockets.

4. A rough terrain transport vehicle comprising:
(a) an undercarriage unit including:

pair of elongate hollow load-bearing side frames positioned in spaced apart relationship;

for rigidly interconnecting said side frames;

three pairs of axles, each axle having a wheel receiving member at one end thereof;

wheel members each mounted on the wheel receiving end of one of said axles;

for rotatably supporting said axles at longitudinally spaced points along the side frames with three of said axles being supported on each of said side frames;

the wheel members of the center pair of axles extending below a plane lying tangent to the bottoms of the endmost wheel members to facilitate skid steering;

transmission means positioned within each of said side frames for drivingly interconnecting the axles rotatably supported by said side frame; and a pair of drive mechanisms each mounted on one of the side frames and each operably connected to the transmission means within its side frame to effect concurrent rotation of the three wheel members of its side frame;

(b) an operator's compartment mounted at the extreme front end of the undercarriage unit;

(c) an engine mounted at the front end of the undercarriage unit substantially in alignment with the front pair of wheel members and operably connected to the drive mechanisms; and (d) a bed mounted on the undercarriage unit for receiving articles to be transported, said bed extending over all three pairs of axles and the wheel members mounted thereon whereby the vehicle is substantially supported either by the forward wheel members and the center wheel members or by the center wheel members and the rearward wheel members depending on the weight distribution of the load carried by the bed.

5. The rough terrain vehicle according to claim 4 wherein each drive mechanism comprises:

a speed reducer having an output shaft operably connected to said transmission means;

a hydraulic motor operably connected to said speed reducer;

a brake operably connected to said speed reducer;

and wherein the engine drives a hydraulic pump for supplying pressurized hydraulic fluid to the hydraulic motors of the drive mechanisms.

6. The rough terrain transport vehicle according to claim 5 wherein each of said transmission means comprises:

a drive sprocket positioned adjacent the middle axle, said drive sprocket having two sets of teeth thereon;

first and second sprockets mounted on said middle axle;

third and fourth sprockets each mounted on one of said end axles;

a first chain constrained about said first sprocket and one set of teeth on said drive sprocket;

a second chain constrained about the other set of teeth on said drive sprocket and said fourth sprocket; and a third chain constrained about said second and third sprockets.

* * * * *